United States Patent
Honjo et al.

(10) Patent No.: US 6,466,416 B1
(45) Date of Patent: Oct. 15, 2002

(54) MAGNETIC HEAD, METHOD FOR MAKING THE SAME AND MAGNETIC RECORDING/REPRODUCING DEVICE USING THE SAME

(75) Inventors: Hiroaki Honjo; Nobuyuki Ishiwata; Tsutomu Ishi; Mikiko Saito; Shinsaku Saito; Tamaki Toba; Yoshihiro Nonaka, all of Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 09/707,805

(22) Filed: Nov. 7, 2000

(30) Foreign Application Priority Data

Aug. 11, 1999 (JP) .......................................... 11-317067

(51) Int. Cl.$^7$ ............................................... G11B 5/127
(52) U.S. Cl. ..................................................... 360/317
(58) Field of Search ............................... 360/317, 313, 360/126, 125, 121

(56) References Cited

FOREIGN PATENT DOCUMENTS

| JP | 63-53277 | 10/1988 |
| JP | 6-346202 | 12/1994 |
| JP | 7-3489 | 1/1995 |
| JP | 7-262519 | 10/1995 |
| JP | 8-212512 | 8/1996 |
| JP | 10-162322 | 6/1998 |
| JP | 11-16120 | 1/1999 |
| JP | 11-74122 | 3/1999 |

OTHER PUBLICATIONS

"A Magnetoresistive Readout Transducer" by Robert P. Hunt IEEE Transactions on Magnetics, vol. Mag–7, No. 1, Mar. 1971, pp. 150–154.

"Design, Fabrication & Testing of Spin–Valve Read Heads for High Density Recording" by Tsang et al IEEE Transactions on Magnetics, vol. 30, No. 6, Nov. 1994, pp. 3801–3806.

"3 Gb/in2 Recording Demonstration with Dual Element Heads & thin Film Disks" by Tsang et al IEEE Transactions On Magnetics, vol. 32, No. 1, Jan. 1996, pp. 7–12.

"5 Gb/in2 Recording Demonstration with Conventional AMR Dual Element Heads & Thin Film Disks" by Tsang et al IEEE Transactions on Magnetics, vol. 33, No. 5, Sep. 1997, pp. 2866–2871.

"Nonmagnetostrictive Compositions of Fe—Ni—Co Films" by C.H.Tolman Journal of Applied Physics, vol. 38, 1967, pp. 3409–3410.

"12 Gb/in2 Recording Demonstration with SV Read Heads & Conventional Narrow Pole–Tip Write Heads" by Tsang et al IIEEE Transactions on Magnetics, vol. 35, No. 2, Mar. 1999, pp. 689–694.

*Primary Examiner*—Allen Cao
(74) *Attorney, Agent, or Firm*—Hayes Soloway P.C.

(57) ABSTRACT

Disclosed is a magnetic heads suitable for high density recording which comprises an ID head where a CoNiFe film or a CoNiFeX film is formed by a physical vapor deposition method and further a plated film of CoNiFe etc. is formed while avoiding vanishment of a seed layer. The ID head shows high reliability and high production efficiency. The upper magnetic pole of the ID head is composed of a laminated layers of a first magnetic layer 13 of a CoNiFe film or a CoNiFeX film which is formed by a physical vapor deposition method, a second magnetic layer 14 of NiFe layer composing a seed layer laminated thereon, and a third magnetic layer 11 of CoNiFe plated film etc. further laminated on the second layer.

15 Claims, 5 Drawing Sheets

MAGNETIC HEAD, METHOD FOR MAKING THE SAME AND MAGNETIC RECORDING/ REPRODUCING DEVICE USING THE SAME

FIELD OF THE INVENTION

This invention relates to a magnetic head used in a magnetic storage device, a method for making the same, and a magnetic storage device using such magnetic head. More particularly, this invention relates to a giant magnetoresistive (GMR) effect type magnetic head with a magnetic recording head of new structure.

BACKGROUND OF THE INVENTION

As miniaturized magnetic storage devices with large capacity are developed, the volume per one bit recorded on a magnetic medium has rapidly become smaller. A magnetoresistive effect type head (hereinafter referred to as "MR head") can detect a magnetic signal generated by this micro bit as a larger reproduced output. The MR head is described in IEEE Transactions on Magnetics MAG7 (1971)150, titled "A Magnetoresistivity Readout Transducer". Further, lately, a giant magnetoresistive effect type head (hereinafter referred to as "GMR effect type head") using giant magnetoresistive effect (hereinafter referred to as "GMR effect") which can create significantly higher output than that in the former MR head has been put into practical use.

The GMR effect is classified into several kinds by the difference of mechanism to give a variation in magnetic reluctance. Among them, a magnetoresistive effect generally called spin-valve effect can generate a large variation of resistance by a small operating magnetic field because the variation of resistance corresponds to the cosine between the magnetization directions of two adjacent magnetic layers. Because of this advantage, the GMR effect type head using spin-valve effect has become the main stream of GMR effect type heads now being developed.

The GMR effect type head using spin-valve effect is described in IEEE Transactions on Magnetics, Vol. 30, No. 6 (1994) 3801, titled "Design, Fabrication & Testing of Spin-Valve Read Heads for High Density Recording". In the GMR head disclosed in this literature, one of two magnetic layers which generate spin-valve effect includes an antiferromagnetic film laminated on that magnetic layer. As a result, its magnetization is pinned by exchange coupling field generated between the both so as to be substantially aligned into the magnetic-field direction of a medium which goes into a magneto-sensitive portion of the head, thereby forming a magnetization-pinned layer. The other magnetic layer being located adjacent to the magnetization-pinned layer through a conductive layer such as Cu forms such a magnetization-free layer that can change the direction of magnetization freely to the magnetic field of medium. Since the description below mainly relates to the GMR effect type head using spin-valve effect, the GMR effect type head using spin-valve effect will be hereinafter called "GMR head".

FIG. 2 is a plan view showing the structure of a GMR head that is seen from an air bearing surface (ABS) opposite to an medium. Also, FIG. 1 is a cross sectional view, cut along the line A–B of FIG. 2, showing the inner structure of the GMR head. The GMR head has such a composite structure that a reproducing element and a writing element are combined. In the GMR reproducing element, a magnetic isolation layer 3, an insulator, is provided between a laminated layer of lower shied 2 and upper shield 6 on ceramic 1 composing a slider. In its center region 4, a spin-valve structure which generates GMR effect is allocated, while at the both ends of the center region 4, terminal regions 5 to supply electric current and bias magnetic field to the spin-valve lamination structure are formed.

Further, while using the upper shield 6 as a first magnetic pole, onto the surface (upper surface) of the first magnetic pole 6 on the opposite side of the GMR element, a second magnetic pole 11 (hereinafter referred to as "upper magnetic pole") is laminated in parallel to the first magnetic pole 6 through a magnetic gap 7. As shown in FIG. 1, a coil 9 sandwiched by an insulator 8 and an insulator 10 is allocated slightly behind the first magnetic pole 6 and the second magnetic pole 11. Writing and recording onto the medium are conducted by magnetic flux leaked from the magneto-gap 7 between the first magnetic pole 6 and the second magnetic pole 11 that are magnetized by the magnetic field generated by the coil 9. This inductive recording head (hereinafter called "ID head") and the reproducing head by GMR mentioned above form an integrated lamination. In general, practical GMR heads employ a composite structure of the ID head and the reproducing head as shown in FIG. 2.

On the other hand, conventional type MR heads using magnetic anisotropy have been also improved to get higher density, and have become able to offer a high density up to about 3 gigabit per square inch. To compete with such an improvement, the storage density of GMR heads of the next generation needs to be in a high-density region of more than 3 gigabits per square inch. Therefore, substantially desired are GMR heads that have a high density recording and reproducing of more than 3 gigabits per square. As a result, a magnetic storage device composed using such a GMR head can achieve a high density recording/reproducing device of more than 3 gigabits per square inch.

Also, as the output of reproducing head, although not limited to the GMR head, becomes higher, the ID head that offers the recording function to a magnetic medium also needs the enhancement of recording performance toward higher density. Especially, in a case that such high density recording as mentioned above is conducted, further improvement of magnetic media for a higher coercive force is required. Namely, in raising the storage density, in order to make the transition length of magnetization recorded on magnetic media smaller and also in order to hold magnetization stable even if the transition length of magnetization per bit becomes shorter, it is necessary for the magnetic media to have further high coercive force. Until now, the development to increase the recording magnetic field of ID head itself has been vigorously conducted so as to conform to a magnetic media with high coercive force suited for the high density recording.

Conventionally, as a magnetic core of ID head, a plated film of Ni-Fe with Ni content ratio of about 80% (hereinafter referred to as "80 NiFe") has been used. It is reported that the 80 NiFe material has a saturation magnetization (Bs) of about 1 T(Tesla) and offers the recording of 3 gigabits per square inch (IEEE Transactions on Magnetics, Vol. 32, No. 1, 1996, pp. 7–12 "3 GB/in$^2$ recording demonstration with dual element heads & thin film disks").

Also, it is suggested that in order to conduct the recording of more than 5 gigabits per square inch, instead of the 80 NiFe, for example, the adoption of a NiFe plated film with Ni content ratio of about 45% (hereinafter referred to as "45 NiFe") is useful (IEEE Transactions on Magnetics, Vol. 33, No. 5, 1997, pp. 2866–2871 "5 GB/in$^2$ recording demonstration with conventional AMR dual element heads & thin film disks"). The 45 NiFe material has a saturation magnetization of about 1.6 T at the maximum. Further, it is reported that using the 45 NiFe material, the recording of about 12 gigabits per square inch becomes possible ("12 GB/in$^2$ recording demonstration with SV read heads & conventional narrow pole-tip write", IEEE Transactions on Magnetics, Vol. 32, No. 1, 1996, pp. 7–12). In addition to these, Japanese patent application Laid-open Nos. 8-212512 and 11-16120 disclose examples using a NiFe plated film with Bs of about 1.6 T.

Other than the NiFe plated film, there are some cases that a high Bs material formed by sputtering is used. For example, Japanese patent application Laid-open No. 10-162322 discloses the use of a Co system amorphous material represented by a CoTaZr sputtered film. The Co system amorphous film can offer a high Bs up to about 1.5 T. Further, Japanese patent application Laid-open No. 7-262519 discloses the application of high Bs material such as iron(III) nitride. The iron-nitrogen system material may offer high Bs up to about 1.9 T.

In the process of making an ID head of magnetic head, when forming a predetermined shape of magnetic pole using a magnetic material such as NiFe, the plating method is frequently used to laminate the magnetic material. Namely, using the plating method, a desired pattern can be obtained by first forming a photoresist frame with a predetermined shape of magnetic pole exposed, next growing a plated film into the frame. Therefore, this method is excellent in simplifying the fabrication process. In addition, this method is also advantageous in lowering the cost. Accordingly, in making a thin-film magnetic head using a NiFe film material that can be formed by plating, the plating has been the standard method.

On the other hand, in case of using a magnetic material to be formed by sputtering method, a desired pattern of magnet pole is obtained by forming a photo resist mask with a pattern of the magnet pole on a magnetic film that is formed in advance, then etching it by using ion beam. This method has some drawbacks below. Firstly an expensive ion beam etching apparatus needs to be used. Secondly a long processing time is required to pattern a magnet-pole film as thick as several $\mu$m. Thirdly the tip of magnet pole that decides the recording width to medium is difficult to form at a narrow width.

For example, in the upper magnetic pole 11, the patterning is applied to part where a large difference of level is formed with the coils 9 and the upper and lower insulating layers. But, it is technically very difficult to conduct the processing to obtain a good shape in such part as has a large difference of level. To avoid such difficulty, Japanese patent application Laid-open No. 7-262519 discloses a method that only the tip portion of magnetic pole is first formed prior to forming the large uneven part with the coils and the insulating layers, and then forming an iron-nitrogen film on the part by sputtering. However, the forming of the tip portion of magnetic pole itself needs to use ion beam etching, and therefore the above method does not give a low-cost manufacturing in view of manufacturing equipment. As explained above, when a sputtered film is applied to a magnetic pole, the complicated process is needed to obtain a predetermined magnetic film pattern, and also it becomes a factor of rising the cost.

Researches have been conducted on such a material system that the plating method can be, like conventional NiFe, applied to in laminating the magnetic material and a high Bs more than 1.6 T being obtained in 45Ni-Fe can be obtained. As one of them, a Co-Fe-Ni system material is deemed to be a hopeful material system that can achieve high Bs more than 1.6 T in the form of a plated film. As mentioned below, for example, the Co-Fe-Ni system material itself actually can achieve high Bs, and means for making its plated film is also proposed.

Japanese patent publication No. 63-53277, FIG. 1, shows a line of non-magnetostriction in a ternary composition of Co-Fe-Ni, specifically, a line of magnetostriction $\lambda$ s=0 in a Co-Fe-Ni plated film, which is cited from Journal of Applied Physics, Vol. 38, 1967, pp 3409–3401. Also, FIG. 2 of the same patent publication shows a plot of intrinsic magnetic flux density in ternary composition of Co-Fe-Ni, and from this FIG. 2, Bs in Co-Fe-Ni plated film can be immediately calculated. These two figures proves that the magnetostriction $\lambda$ s becomes substantially zero in around Co80%-Fe10%-Ni10% and Bs becomes about 1.6 T. Japanese patent publication No. 63-53277 also suggests an example of composite of electroplating bath and plating conditions to be used when conducting Co-Fe-Ni plating of above composition.

Japanese patent application Laid-open No. 6-346202 describes about an improving means to attempt compatibility of low magnetostriction and high Bs around Co80%-Fe10%-Ni10% formerly proposed in Japanese patent publication No. 63-53277, namely, the adjustment of crystallinity of Co-Fe-Ni is conducted. As the result of adjusting the crystallinity, a Co-Fe-Ni plated film with Bs of about 1.7 T is obtained at magnetostriction $\lambda$ s<5×10$^{-6}$. Also, Japanese patent application Laid-open No. 7-3489 describes that in around Co80%-Fe10%Ni10%, a plated film with low coercive force and Bs in the range of 1.3 T to 2 T was obtained by adjusting the crystallinity. Meanwhile, the details of a concrete composition having Bs as high as 2 T are not disclosed.

Japanese patent No. 2821456 describes about a high-purity plated film, which has a sulfur content ratio reduced to 0.1% or less, obtained by forming a Co-Ni-Fe plated film using a plating bath composite not including an additive such as saccharin. In this high-purity plated film, compared with the plated film made by the method in Japanese patent publication No. 63-53277, a composition of mixed crystal composed of crystal system fcc and bcc moves to a region including more Fe content, and magnetostriction is decreased to a practically usable level by the composition. In addition, it is disclosed that a Co-Ni-Fe plated film obtained offers Bs as high as 1.9 T to 2.2 T as well as a soft magnetic characteristic with magnetizing ratio of 2.5 Oe or less.

As mentioned above, in the Co-Ni-Fe system plated film, a composition to achieve a practical soft magnetic characteristic required to a magnetic material for magnetic head greatly varies by the crystallinity or the content of material mixed into the plated film. In this regard, as disclosed in Japanese patent No. 2821456 etc., it is proved that the Co-Ni-Fe system material is capable of achieving a very large Bs and an excellent soft magnetic characteristic by adjusting the crystallinity and the content of material mixed into the plated film.

In forming a plated film using the plating method, a conductive film, a seed layer is first formed on a substrate by physical vapor deposition method such as sputtering and vapor deposition, and then electric current is supplied to the seed layer in a plating bath to form a required film. Conventionally, in the case of NiFe system plated film, NiFe film is also used as the seed layer.

On the other hand, even when a magnetic material with Bs of 1 T or more is used for the upper magnetic pole, if the seed layer composed of a magnetic material with Bs of 1 T or less is allocated as its base layer, there occurs a problem that, in comparison with the case that Bs of the base layer is also 1 T or more, the rise of recording magnetic field becomes later and the recording magnetic field itself becomes weaker. Therefore, in order to make the most of advantage of the high Bs upper magnetic pole itself, it is also necessary for the seed layer laid thereunder to use a magnetic material with high Bs of 1 T or more. As a material with such large Bs suitable for the seed layer, there is a CoNiFe film or a CoNiFeX film (X is at least one element selected from Cr, Ti, V, Ru, Rh, Pd, Os, Ir and Pt) having a saturation magnetic flux density of 1.6 T to 2 T and being formed by physical vapor deposition method.

The inventors of this invention have discovered that forming the CoNiFe film or CoNiFeX film to be used as the seed layer by physical vapor deposition method, and then forming, thereon, a Co-Ni-Fe plated film of desired composition, for example, a Co-Ni-Fe plated film with Bs that is selected from the range of 1.9 T to 2.2 T by plating method offer that the seed layer itself provided as the base layer also has a large Bs of 1.6 T to 2 T, thereby the advantage of large Bs of the plated film used as the upper magnetic pole can be obtained sufficiently.

However, in forming actually the Co-Ni-Fe plated film using the CoNiFe film or CoNiFeX film, the seed layer formed by physical vapor deposition method, there occur some problems mentioned below.

First, when forming the plated film with a composition of about 80%-Fe10%-Ni10%, the CoNiFe film or CoNiFeX film, the seed layer formed by physical vapor deposition method melts into a plating bath. This causes a variation in composition of the plating bath near the seed layer, so that a plated film with high Bs intended can not be formed. In the extreme case, the seed layer at the window portion of frame-resist is partly lost, therefore preventing the plated film from being formed.

Next, there is also a case that during the plating, part of the seed layer melts into the plating bath, thereby a gap is created between the seed layer and frame-resist. On that occasion, the plating bath soaks into under the frame-resist, which causes an abnormal shape of the plated film. Namely, the upper magnetic pole becomes a different shape from desired one.

In both of the above cases, the Co-Ni-Fe plated film obtained does not show a desired characteristic, and becomes a factor to lower the reliability and the productivity of ID head that is required to have a high density recording performance.

Accordingly, desired is a method of forming Co-Ni-Fe plated film that prevents the CoNiFe film or CoNiFeX film, the seed layer formed by physical vapor deposition method from melting into the plating bath, thereby giving a Co-Ni-Fe plated film with desired composition and shape.

SUMMARY OF THE INVENTION

Accordingly, it is an object of the invention to provide a magnetic head suitable for high density recording which adopts an upper magnetic pole of new structure where the disadvantages caused by using a CoNiFe film or a CoNiFeX film formed by physical vapor deposition method as a seed layer are solved and ID head used for recording onto a magnetic medium itself shows high reliability and production efficiency.

It is a further object of the invention to provide a method for making a magnetic head by which the above structure of upper magnetic pole can be made up high reproduction ratio, and also to provide a magnetic recording device using the magnetic head suitable for high density recording.

It is a still further object of the invention to provide a structure of an upper magnetic pole (magnetic core for recording) suitable for ID head which can attain higher output of reproducing heads not restricted to GMR head together with higher density recording performance, and to provide a magnetic head adopting such structure of upper magnetic pole.

The inventors of the invention found out the following facts.

For example, in a magnetic head with structure shown in FIG. 4, an upper magnetic pole (second magnetic core) composing ID head used in magnetic recording is formed to be a laminated layer type magnetic core comprising a first magnetic layer located at the most neighboring position to an electrical insulating layer forming magneto-gap (recording gap) which is provided between a lower magnetic pole (first magnetic core) and the upper one, a second magnetic layer laminated thereon, and further a third magnetic layer which is formed into a desired shape on the second magnetic layer using a frame resist. In this structure, when the second magnetic layer is composed of a magnetic material which substantially does not melt into a plating bath for the third magnetic layer, the first and second magnetic layer do not melt into the plating bath, and therefore occurrence of abnormally shaped plated film due to invasion of the plating bath into the under portion of the frame resist can be prevented. In addition, when the structure of the laminated layer type magnetic core is adopted, the density of magnetic flux leaked from between the magnetio-gap depends mainly on the saturation magnetic flux density Bs of the first magnetic layer, and also when a magnetic material with large saturation flux density Bs is used in the third magnetic layer, density of the magnetic flux becomes higher corresponding to Bs of the first magnetic layer and Bs of the third magnetic layer. Even if the saturation flux density Bs of the second magnetic layer itself is smaller than Bs of the first magnetic layer and Bs of the third magnetic layer, the magnetic flux density leaked from between the magneto-gap becomes higher corresponding to Bs of the first magnetic layer and Bs of the third magnetic layer. This invention is made on the basis of such knowledge.

According to the first aspect of the invention, a magnetic head with an inductive head type recording head used in recording onto a magnetic medium, comprises:

an inductive head type recording head of such structure as being provided with a magneto-gap layer of non-magnetic and non-conductive material between a first magnetic core and a second magnetic core, and an exciting coil electrically isolated from the first magnetic core and the second magnetic core, wherein a part of magnetic flux from magnetic cores excited by the exciting coil leaking from the magneto-gap layer, and recording onto the magnetic medium being conducted by the leaking flux;

wherein the second magnetic core is a laminated type magnetic core comprising laminated three kinds of layers of a first magnetic layer allocated most adjacently to the magneto-gap layer, a second magnetic layer laminated on the first magnetic layer, and a third magnetic layer formed to be a desired shape on the second magnetic layer by frame plating, and as the second magnetic layer, a magnetic material which substantially does not melt while plating of the third magnetic layer is conducted is selected.

In the magnetic head, it is more favorable that the third magnetic layer comprises at least one layer of layers composed of CoNiFe system magnetic material. The third magnetic layer composed of CoNiFe system magnetic material may be such structure that it comprises, in addition to a layer of CoNiFe system magnetic material, a layer of NiFe system magnetic layer laminated with the CoNiFe system magnetic material, and at least one layer of the layers of CoNiFe system magnetic material is allocated so as to contact with the second magnetic layer.

In addition, it is more favorable that the first magnetic layer is composed of a CoNiFe system magnetic material, or a layer of a magnetic material whose main constituent is CoNiFeX, where X is at least one element selected from a group of Cr, Ti, V, Ru, Rh, Pd, Os, Ir and Pt.

Furthermore, in the magnetic head according to the first aspect of the invention, a layer of a non-magnetic material may be provided as a base layer for the first magnetic layer. Favorably, the base layer includes at least one layer of a film of non-magnetic material selected from a group of Ti, Ta, Cr, TiW, TaN, TiN, Mo, Si and SiN. Also, thickness of the base layer may be selected from a scope of 10 nm to 50 nm.

On the other hand, in the magnetic head according to the first aspect of the invention, for example, in case that the third magnetic layer includes a CoNiFe system magnetic material, it is favorable that a layer of a magnetic material of NiFe system alloy is used in the second magnetic layer. Also, it is more favorable that thickness of said second magnetic layer is selected from a scope of 5 nm to 100 nm.

A magnetic head according to the invention may comprise, in addition to the inductive head type recording head, a magnetoresistive effect type read head used when reading record on a magnetic medium. The magnetoresistive effect type read head may be a structure that it comprises a first magnetic shield and a second magnetic shield opposing to each other and an insulating layer isolating between them, and one of the opposing magnetic shields is formed, together with the first magnetic core of the inductive type recording head, into one body. Also, one of the opposing magnetic shields may be used as the first magnetic core of the inductive head type recording head.

According to the second aspect of the invention, a magnetic recording-reproducing device comprises the magnetic head according to the invention installed therein.

According to the third aspect of the invention, a method for making a magnetic head, comprises:

in making the second magnetic core composing said inductive head type recording head, a process for making a first magnetic layer composing the second magnetic core, a second magnetic layer formed on the first magnetic layer, and a third magnetic layer formed to be a desired shape on the second magnetic layer by frame plating comprises the steps of:

forming the first magnetic layer using physical vapor deposition method;

forming the second magnetic layer using physical vapor deposition method;

forming a desired shape of resist frame on the second magnetic layer; and forming, using the desired shape of resist frame, the third magnetic layer formed by frame plating by electroplating method by supplying electric current at least to the second magnetic layer.

BRIEF DESCRIPTION OF THE DRAWINGS

The invention will be described in more detail in conjunction with the appended drawings, wherein.

DETAILED DESCRIPTION OF THE PREFERRED EMBODIMENT

In a magnetic head according to the invention, CoFeNi plated film is used in making an ID head which can attain high density recording performance. More specifically, the magnetic head adopts a form of composite type magnetic head comprising a reproducing head using various magnetoresistive effect elements and an ID head for reading. And, CoFeNi plated film is used in one of magnetic cores (upper magnetic pole) of the ID head suitable for such composite type magnetic head.

Figure 3:
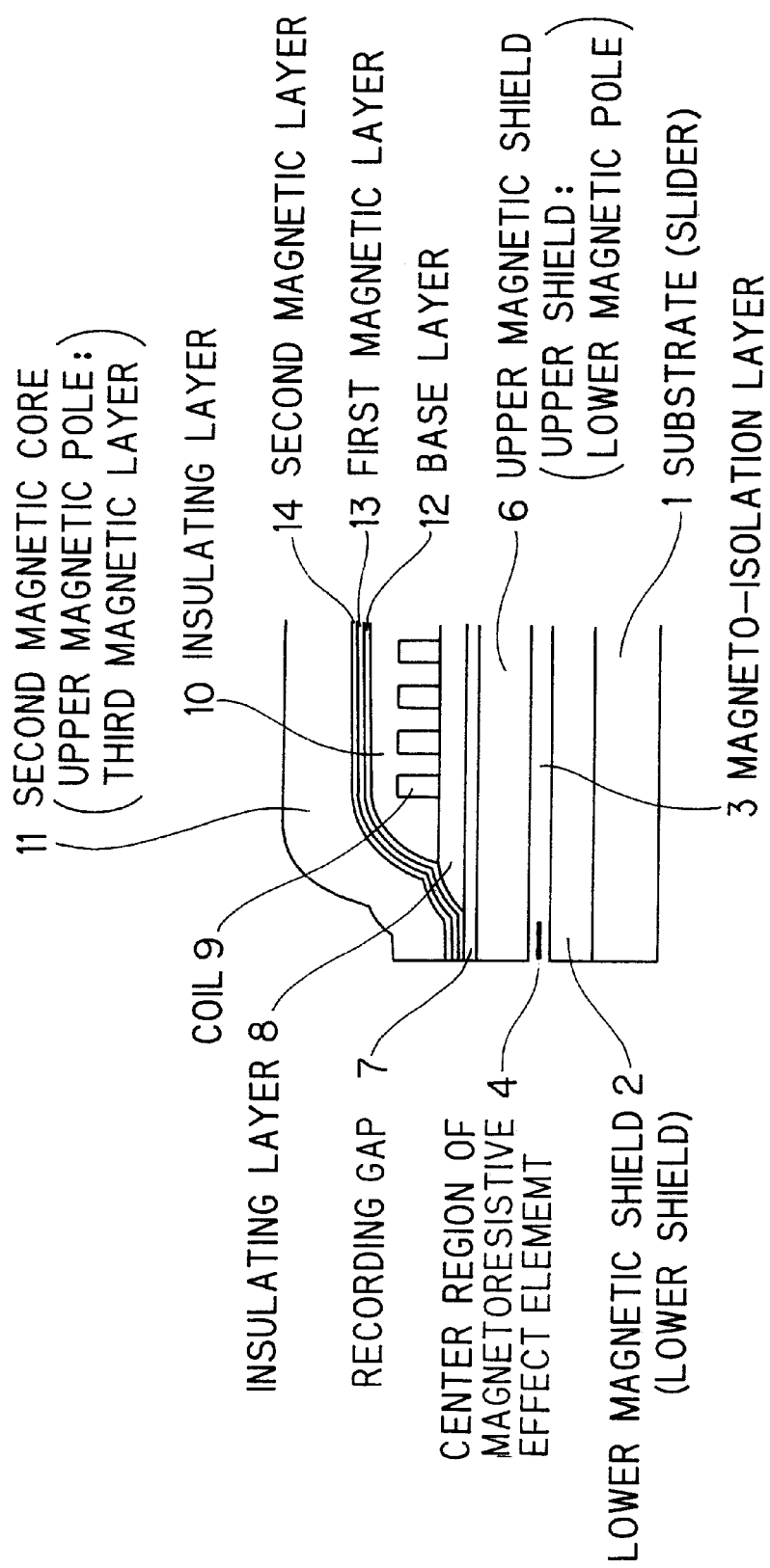
FIG. 3 is a view showing briefly the structure of cross section of a magnetic head according to the invention.
Figure 4:
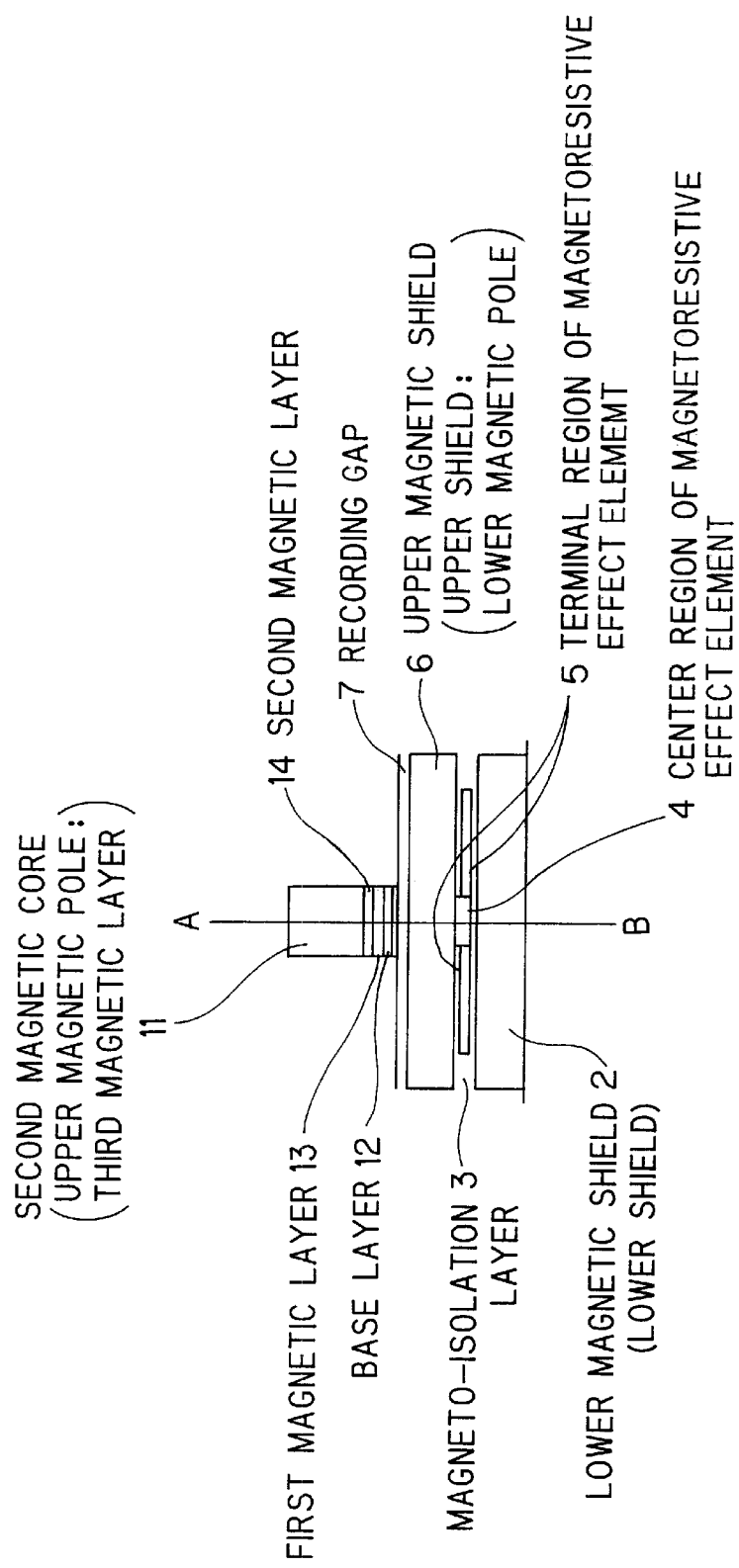
FIG. 4 is a view showing briefly the layout of GMR head type reproducing head using spin-valve effect and ID head type recording head which compose a magnetic head according to the invention.

The structure of a magnetic head according to the invention will be explained in details below referring to the drawings. FIG. 4 is a view showing briefly an example of structure of a magnetic head according to the invention. The structure is of a composite type magnetic head in which a reproducing head and ID head for reading are formed into one body. FIG. 4 is a view seen from ABS side where the composite type magnetic head is allocated. FIG. 3 is a view (partial view) showing briefly the structure of cross section taken on a line A–B of FIG. 4.

In the structure shown in FIG. 4, the reproducing head comprises a lower magnetic shield 2 and an upper magnetic shield 6 allocated on a substrate 1 such that each opposes to the other via a magnetism-isolation layer 3. At the center of an element within the magneto-isolation layer 3, a magnetoresistive effect element which conducts reproducing by magnetoresistive effect is allocated. An electrical insulating layer is provided between the two sheets of magnetic shields and the magnetoresistive effect element, and it isolates the both electrically. A center region 4 of the magnetoresistive effect element is the part detecting record (magnetization) on a magnetic medium, and in terminal regions 5 of the magnetoresistive effect element on the right and the left of center region 4, means for supplying bias magnetic field and electric current to the center region 4 are provided.

On the other hand, a recording head adopts the structure of ID head. The magnetic core comprises a first magnetic core (lower magnetic pole) 6 and a second magnetic core (upper magnetic pore) 11 with a recording gap 7 located between them. A coils 9 is provided near the second magnetic core (upper magnetic pore) 11 to give excitation to it. Meanwhile, the coil 9 is formed on an insulating layer 8 to be electrically insulated from others, and covered by an insulating layer 10. Like the conventional type magnetic head shown in FIG. 1, the coil 9 is formed by copper plating, for example, and provided with an electrode to supply exciting current. Also, the recording gap 7 is formed with a plated film of non-magnetic, non-conductive material. The parts mentioned above can adopt substantially the same partial structure as those in the conventional type magnetic heads.

In an example of structure shown in FIG. 4, the first magnetic core (lower magnetic pole) 6 and the upper magnetic shield 6 are composed of a composite type element using the same magnetic film. On the other hand, the second magnetic core (upper magnetic pole) 11 comprises a first magnetic layer 13, a second magnetic layer 14, and a third magnetic layer made by electroplating. Also, a base layer 12 of thin film is provided as the foundation of the first magnetic layer 13, and performs a role to enhance adhesion between the insulating layer 8, insulating layer 10, recording gap 7 and the second magnetic core (upper magnetic pole) 11 formed on them.

The first magnetic layer 13 and the second magnetic layer 14 are used as the layers to supply electric current when the third magnetic layer 11 is formed by electroplating method, and composed of magnetic materials with conductivity. The second magnetic layer 14 contacts directly with a plating bath when the third magnetic layer 11 is formed by electroplating method, but in the invention, a magnetic material which does not melt substantially in the plating bath is selected. The first magnetic layer 13 is covered by the second magnetic layer 14, and is of a structure substantially not to contact with the plating bath. The third magnetic layer 11 is formed to have a predetermined thickness and shape, by forming a desired shape of resist frame on the second magnetic layer 14 and applying frame plating thereto.

In the magnetic head according to the invention, favorably, the first magnetic film 13 is laminated to have a predetermined film thickness, by a physical vapor deposition method such as sputtering or vapor deposition, on the base layer 12 which has been formed into a predetermined length in advance. Next, the second magnetic film 14 is formed to have a predetermined film thickness so as to cover the first magnetic film 13. Favorably, the first magnetic film 13 uses a magnetic material which can be formed by the physical vapor deposition method and shown high Bs, and more favorably, it is composed of, for example, a layer of CoNiFe system magnetic material or a layer of magnetic material whose main constituent is CoNiFeX (X is at least one element selected from Cr, Ti, V, Ru, Rh, Pd, Os, Ir, Pt). Also, it is good that the third magnetic layer 11 uses, like the first magnetic film 13, a magnetic material showing high Bs, specifically, a layer which includes CoNiFe system magnetic material. The third magnetic layer 11 may be a lamination structure where a layer of CoNiFe system magnetic material and a layer of other magnetic material, for example, NiFe system magnetic material are laminated, but in that case, it is favorable that the the layer of CoNiFe system magnetic material contacts the second magnetic layer 14.

The second magnetic layer 14 is composed of a magnetic material which substantially does not melt into the plating bath when the third magnetic layer 11 is made by electroplating, but, for example, in a case that a layer of CoNiFe system material as contained in the third layer 11 is formed, it is favorable to use NiFe system magnetic material. The second magnetic layer 14 functions to cover the first magnetic layer 13 formed by physical vapor deposition method, and to prevent the magnetic material composing the first magnetic layer 13 from melting into the plating bath while the third magnetic layer 11 is formed by electroplating method. Therefore, the film thickness is sufficient if a covering with uniformity is obtained, and usually thickness of the film is selected from a scope of 5 nm to 100 nm. Also, the second magnetic layer 14, like the first magnetic layer 13, is laminated to a predetermined thickness using physical vapor deposition method such as sputtering or vapor deposition.

As the base layer 12, a thin film of non-magnetic material is used. It is favorable to use, for example, a non-magnetic material selected from a group of Ti, Ta, Cr, TiN, TaN, TiN, Mo, Si, and SiN. Also, since the base layer 12 is provided for the purpose of supplementing the adhering force mainly of the first magnetic layer 13, it is favorable to select the thickness to be a scope of 10 nm to 50 nm. Like the first magnetic layer 13, the base layer 12 is laminated to have a predetermined thickness using physical vapor deposition method such as sputtering or vapor deposition. The base layer 12 is well adhered to the first magnetic layer 13, and therefore it performs a role to prevent such phenomena that the plating bath soaks into the first magnetic layer 13 due to peeling off and the magnetic material composing the first magnetic layer 13 melts into the plating bath. Furthermore, when the first magnetic layer 13 itself can be formed to have good adhering property, the base layer 12 may be omitted. However, when forming the first magnetic layer 13 on at least three kinds of structural components including the insulating layer 8, insulating layer 10 and recording gap 7 each being composed of different material from the others, it is favorable to provide the base layer 12.

In the magnetic head according to the invention, by covering the first magnetic layer 13 made of a material with poor resistance against the plating bath by the second magnetic layer 14 composed of a material being strong in resistance against the plating bath, the second conductive layer 14 functions as a protective film for the first conductive layer 13 and prevents the first conductive layer 13 from melting into the plating bath. Therefore, the composition of magnetic materials for the first magnetic layer 13 and the third magnetic layer 11 each can be selected optionally. Especially, the third magnetic layer 11 of thick film can be formed to be an ID head with uniformly dispersed composition and without abnormally shaped portion due to soaking of the plating bath into under the frame resist.

Also, in the magnetic head according to the invention, it is favorable that the upper magnetic shield 6 used as the first magnetic core (lower magnetic pole) adopts a structure that, in the part contacting with the recording gap 7, a layer of the same material as the magnetic material used in the third magnetic layer of the second magnetic core (upper magnetic pole) 11 is used. For example, when using a layer of CoNiFe system magnetic material in the third magnetic layer 11, it is favorable to provide a layer of CoNiFe system magnetic material in the part of the first magnetic core (lower magnetic pole) 6 contacting with the recording gap 7.

Figure 1:
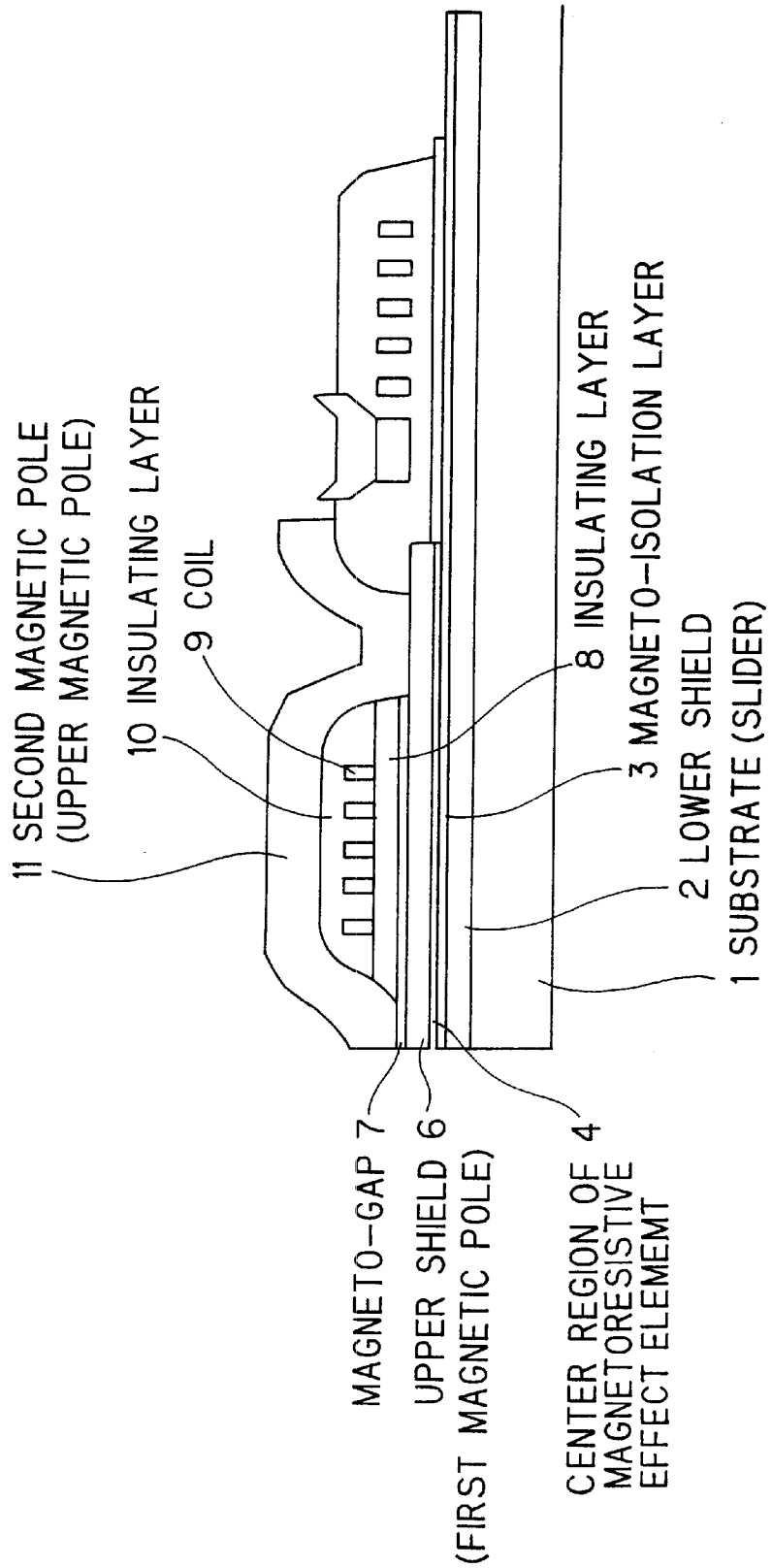
FIG. 1 is a view showing briefly the structure of cross section of a conventional magnetic head.
Figure 2:
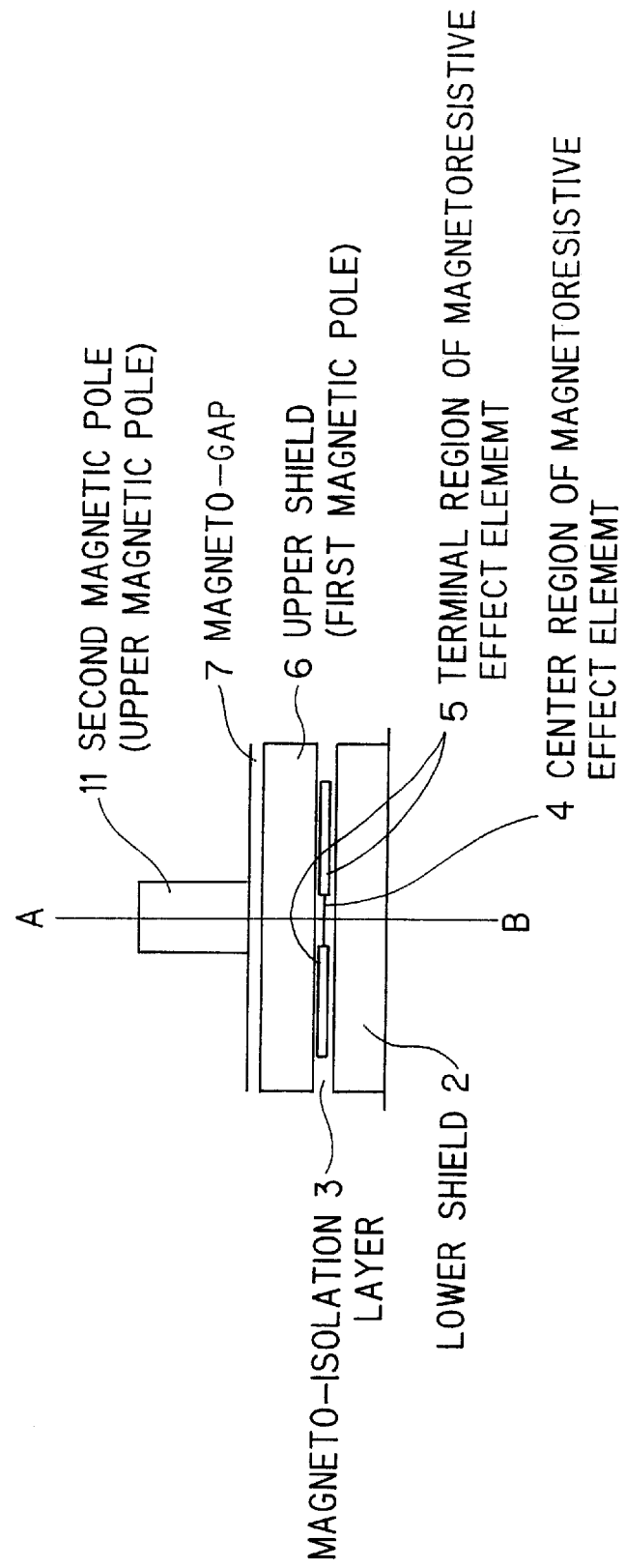
FIG. 2 is a view showing briefly the layout of conventional GMR head type reproducing head using spin-valve effect and ID head type recording head which compose a magnetic head.

The magnetic head according to the invention shown in FIG. 4 and FIG. 3 can adopt, except the structure of ID head corresponding to the recording head portion mentioned above, substantially the same structure as the conventional magnetic head shown in FIG. 2 and FIG. 1. Specifically, the magnetoresistive effect element corresponding to the reproducing head and the magnetic shield allocated above and under it can adopt the magnetoresistive effect element which is adopted in the conventional magnetic heads using GMR effect generally called spin-valve effect. For example, in the magnetic head according to the invention also, except materials to be used, structural component parts which are substantially common to conventional magnetic heads may be formed according to the method for making an magnetoresistive effect element etc. disclosed in Japanese patent application No. 10-162322 etc. In addition, except the part of the second magnetic core (upper magnetic pole) 11 as mentioned in the above, shape, size etc. of respective parts composing the magnetic head can be selected properly according to the shape of the magnetic heads disclosed in Japanese patent application Laid-open No. 10-162322 etc. Also, in the third magnetic layer, which is a characteristic of the magnetic head according to the invention, formed on the second magnetic layer by electroplating method, for example, the plating process of CoNiFe system magnetic materials therefor can be conducted according to the methods disclosed in Japanese patent application Laid-open No. 6-346202 or Japanese examined patent publication No. 63-53277.

And, in a magnetic recording-reproducing device in which the magnetic head according to the invention is mounted, magnetic field for recording of the recording head itself can be raised to a level where, for example, coercive force of magnetic medium being 3500 Oe or more and recording density per square inch being 10 gigabit.

EXAMPLE

The magnetic head of the invention will be explained in still more detail below citing a concrete example. The explanation is made referring to a plurality of drawings, but in all figures, the same parts (corresponding parts) are indicated by the same reference numerals and repeated explanation relating thereto is omitted. Furthermore, the example explained below is one of the preferred embodiments according to the invention, but the scope of the invention is not restricted to it.

FIG. 3 and FIG. 4 show the structure of a magnetic head used in the embodiment. FIG. 4 is a view of the magnetic head seen from ABS, and FIG. 3 is a cross sectional view showing a cross section perpendicular to ABS taken on a line A–B of FIG. 4.

A substrate 1 composing a slider is of composite ceramic consisting of alumina and titanium carbide. On the substrate 1, a MR head with reproducing function is formed. The MR head is composed of a lower shield 2 of patterned CoZrTa film, an upper shield 6 of the NiFe film whose Ni content ratio is about 80%, and a magnetoresistive effect element 4 located between them via a magnetio-isolation layer 3. The thickness of the lower shield 2 is 1 µm and the thickness of the upper shield 6 is 3 µm. Also, the distance of the gap between the lower shield 2 and the upper shield 6 is 0.13 µm.

The magnetoresistive effect element allocated in the gap, as shown in FIG. 4, comprises a center region 4 which perceives magnetic field from a recording medium and terminal regions 5 with function to supply bias magnetic field and electric current to the center region 4. The center region 4 is composed of a film of laminated structure with GMR effect generally called spin-valve effect. Specifically, it is a film of laminated structure comprising, from the lower shield 2 side, a base Zr film (film thickness: 3 nm), PtMn film (film thickness: 20 nm), CoFe film (film thickness: 2 nm), Cu film (film thickness: 2.1 nm), CoFe film (film thickness: 0.5 nm), NiFe film (film thickness: 2 nm), and Zr film (film thickness: 3 nm). The width of the center region 4 is 0.5 µm, which defines the width of reproducing track.

Also, the terminal regions 5 is composed of a laminated structure of CoPt film (film thickness: 20 nm) used as permanent magnet film and Au film (film thickness: 50 nm) used as electrode film for supplying electric current.

On the GMR head, the upper shield 6 composed of a composite film of NiFe film of 2.0 µm and CoNiFe film of 0.5 µm using a plating bath not including saccharin additive is formed via a non-magnetic film of Ti (film thickness: 3 nm) and a conductive layer of NiFe (film thickness: 100 nm). By providing the non-magnetic film of Ti, adhering force between the upper shield 6 and the magneto-isolation layer 3 is enhanced, and therefore occurrence of film peeling-off caused by the stress of CoNiFe film composing the upper shield 6 which uses the plating bath not including saccharin additive can be prevented. The non-magnetic layer shows good adhering force when its film thickness is 2 nm or more, but 10 nm becomes the top limit because a thicker film makes the length of reproducing gap larger.

Combined with the reproducing head portion, an ID head with recording function using the upper shield 6 as a first magnetic pole (lower magnetic pole) is formed. In the ID head, the upper shield 6 composes the first magnetic pole (lower magnetic pole), and its zero-start-height is defined by a non-magnetic insulator 8 allocated on the first magnetic pole 6 via a recording gap (magnetic gap) 7 of alumina with a thickness of 0.18 µm. The non-magnetic insulator 8 in this embodiment is composed of photoresist.

Next, a coil 9 composed of Cu plated film is formed on the non-magnetic insulator 8. Further, a non-magnetic insulator 10 is formed so as to cover the outer surface of the non-magnetic insulator 8. The coil 9 is insulated by these non-magnetic insulators 8 and 10. The non-magnetic insulators 10 in this embodiment is composed of photoresist.

On the non-magnetic insulators 10, Ti film of 10 nm thick composing a base layer (adhering layer) 12 to be used as a seed layer for plating, a first magnetic layer 13 of CoNiFe of 100 nm thick, and a second magnetic layer 14 of NiFe film of 10 nm thick are formed in order by sputtering. When the film thickness of the second magnetic layer 14 is thin, its covering performance for the first magnetic layer 13 becomes poor. Therefore, usually the second magnetic layer 14 is needed to have the film thickness of 5 nm or more. Also, when the thickness of the second magnetic layer is too thick, the grade of record magnetic field becomes gentle, and the writing capability of magnetic head becomes lowered. Therefore, thickness of the second magnetic layer is selected, favorably, to be 100 nm or less.

Further, using frame resist, an upper magnetic pole 11 composed of a CoNiFe film of 0.5 µm thick and a NiFe film of 2.8 µm thick is formed on the second magnetic layer 14 by electrolytic plating as the third magnetic layer 11. It enhances further the effective writing capability obtained by adopting CoNiFe film in the first magnetic layer 13. Its performance is sufficiently maintained if the film thickness of the CoNiFe system magnetic material such as CoNiFe plated film contained in the third magnetic layer 11 is 0.1 µm or more.

By forming the second magnetic layer 14 on the first magnetic layer 13, the first magnetic layer 13 of CoNiFe film which has poor resistance against the plating bath for the third magnetic layer 11, can be protected by the NiFe film with high resistance against the plating bath. By the effect of covering, it can be prevented that the CoNiFe film of first magnetic layer 13 melts into the plating bath, and that the upper magnetic pole 11 becomes abnormal shape due to that the plating bath soaks into under the frame resist.

Figure 5:
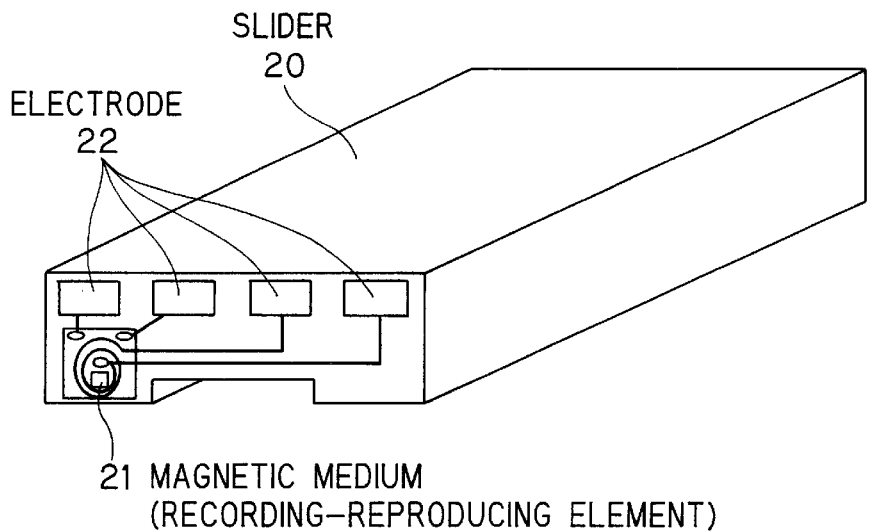
FIG. 5 is a view showing the layout of a magnetic head element and an electrode attached to it on a slider according to the invention.
Figure 6:
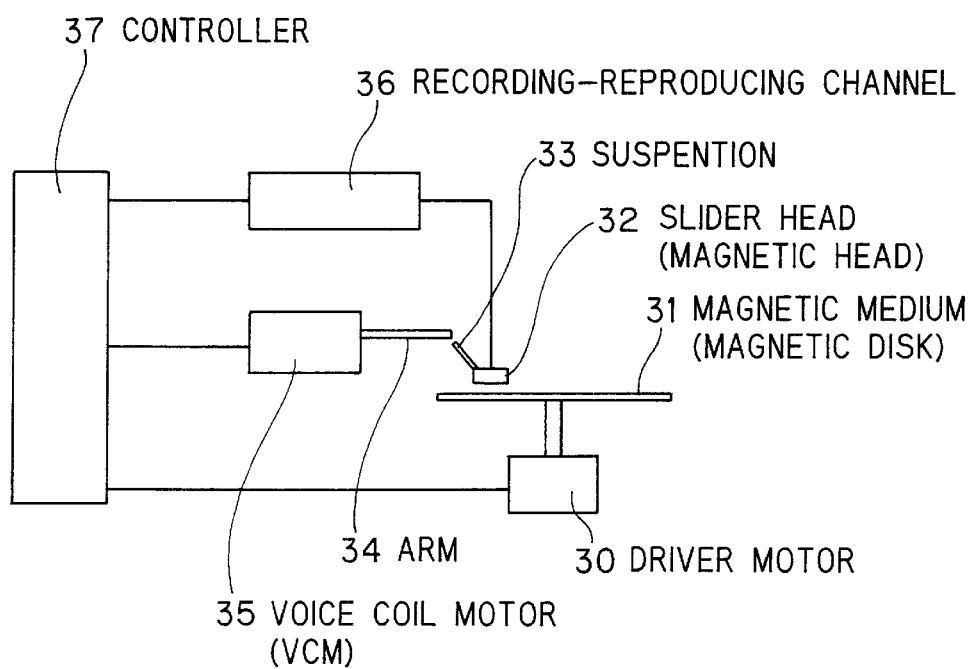
FIG. 6 is an explanatory view showing briefly the composition of a magnetic recording and reproducing device in which a magnetic head is mounted.

FIG. 6 shows the structure of a magnetic storage-reproducing device in which the magnetic head according to this embodiment is mounted. Opposing to the magnetic storage surface of a magnetic media 31 rotated by a drive motor 30, the magnetic head 32 according to the invention is attached by a suspension 33 and an arm 34. The magnetic head is made tracking by a voice coil motor (VCM) 35. The magnetic head itself, as shown in FIG. 5, comprises a slider 20, electrodes 22, and a storage-reproducing element 21. The storage-reproducing operation is conducted by a signal sent from a storage-reproducing channel 36 to the magnetic head 32. The storage-reproducing channel 36, VCM 35 to decide the location of the magnetic head 32, and the drive motor 30 are linked with a controller 37.

In the magnetic storage-reproducing device mentioned above, by making the coercive force of the magnetic medium 31 to be 350 Oe or more and making the magnetic gap between the medium 31 and the magnetic head 32 to be 35 nm, a magnetic storage-reproducing device with packing density of 10 gigabit/square inch or more can be created.

As mentioned in the above, in the magnetic head according to the invention, the upper magnetic pole composing ID head used for recording is formed to laminated structure comprising the first magnetic layer, the second magnetic layer and the third magnetic layer formed on the second magnetic layer by electrolytic plating method, so that occurrence of disadvantages such as the magnetic material with high Bs melts into plating bath can be prevented. With this, the upper magnetic pole becomes a structure comprising the seed layer composing the base which itself is of a magnetic material with high Bs, so that higher magnetic field is obtained. Therefore, the magnetic head according to the invention becomes a composite type magnetic head which comprises a GMR head type reproducing head using spin-valve effect and an ID head type recording head, thereby having sufficient capability to realize high density recording and reproducing of 10 gigabit per square inch or more. Also, since the method for making the magnetic head according to the invention uses frame plating method, high working efficiency and reproduction ratio can be obtained, and the rise of production cost can be checked. Further, the magnetic storage-reproducing device using the magnetic head according to the invention can realize high density storage-reproducing of 10 gigabit per square inch or more within practically applicable production cost.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A magnetic head with an inductive head type recording head used in recording onto a magnetic medium, comprising:
    an inductive head type recording head of a structure as being provided with a magneto-gap layer of non-magnetic and non-conductive material between a first magnetic core and a second magnetic core, and an exciting coil electrically isolated from said first magnetic core and said second magnetic core, wherein a part of magnetic flux from magnetic cores excited by said exciting coil leaking from said magneto-gap layer, and recording onto said magnetic medium being conducted by said leaking flux;
    wherein said second core is a laminated type magnetic core comprising laminated three kinds of layers of a first magnetic layer allocated most adjacently to said magneto-gap layer, a second magnetic layer laminated on said first magnetic layer, and a third magnetic layer formed to be a desired shape on said second magnetic layer by frame plating, and as said second magnetic layer, a magnetic material which substantially does not melt while plating of said third magnetic layer is conducted is selected.

2. A magnetic head, according to claim 1, wherein:
    said third magnetic layer comprises at least one layer of layers composed of CoNiFe system magnetic material.

3. A magnetic head, according to claim 2, wherein:
    said third magnetic layer composed of CoNiFe system magnetic material comprises, in addition to a layer of CoNiFe system magnetic material, a layer of NiFe system magnetic layer laminated with said CoNiFe system magnetic material, and at least one layer of said layers of CoNiFe system magnetic material is allocated so as to contact with said second magnetic layer.

4. A magnetic head, according to claim 1, wherein:
    said first magnetic layer is composed of a CoNiFe system magnetic material.

5. A magnetic head, according to claim 1, wherein:
    said first magnetic layer is composed of a layer of magnetic material whose main constituent is CoNiFeX, where X is at least one element selected from a group of Cr, Ti, V, Ru, Rh, Pd, Os, Ir and Pt.

6. A magnetic head, according to claim 1, wherein:
    a layer of a non-magnetic material is provided as a based layer for said first magnetic layer.

7. A magnetic head, according to claim 6, wherein:
    said base layer includes at least one layer of a thin film of non-magnetic material selected from a group of Ti, Ta, Cr, TiN, TaN, TiN, Mo, Si and SiN.

8. A magnetic head, according to claim 6, wherein:
    thickness of said base layer is selected from a scope of 10 nm to 50 nm.

9. A magnetic head, according to claim 2, wherein:
    a layer of magnetic material of NiFe system alloy is used in said second magnetic layer.

10. A magnetic head, according to claim 4, wherein:
    a layer of magnetic material of NiFe system alloy is used in said second magnetic layer.

11. A magnetic head, according to claim 1, wherein:
    thickness of said second magnetic layer is selected from a scope of 5 nm to 100 nm.

12. A magnetic head, according to claim 1, wherein:
    said magnetic head comprises, in addition to said inductive head type recording head, a magnetoresistive effect type read head used when reading record on a magnetic medium, said magnetoresistive effect type read head comprises a first magnetic shield and a second magnetic shield opposing to each other and an insulating layer isolating between them, and one of said opposing magnetic shields is formed, together with said first magnetic core of said inductive type recording head, into one body.

13. A magnetic recording/reproducing device comprising said magnetic head according to claim 1.

14. A magnetic recording/reproducing device comprising said magnetic head according to claim 11.

15. A method for making a magnetic head comprising: an inductive head type recording head of a structure as being provided with a magneto-gap layer of non-magnetic and non-conductive material between a first magnetic core and a second magnetic core, and an exciting coil electrically isolated from said first magnetic core and said second magnetic core, wherein a part of magnetic flux from magnetic cores excited by said exciting coil leaking from said magneto-gap layer, and recording onto said magnetic medium being conducted by said leaking flux; wherein said second core is a laminated type magnetic core comprising laminated three kinds of layers of a first magnetic layer allocated most adjacently to said magneto-gap layer, a second magnetic layer laminated on said first magnetic layer, and a third magnetic layer formed to be a desired shape on said second magnetic layer by frame plating, and as said second magnetic layer, a magnetic material which substantially does not melt while plating of said third magnetic layer is conducted is selected, of said method, a process of making said second magnetic core comprising the steps of:

forming said first magnetic layer using physical vapor deposition method;

forming said second magnetic layer using physical vapor deposition method;

forming a desired shape or resist frame on said second magnetic layer; and forming, using said desired shape of resist frame, said third magnetic layer formed by frame plating by electroplating method by supplying electric current at least to said second magnetic layer.

\* \* \* \* \*

UNITED STATES PATENT AND TRADEMARK OFFICE
CERTIFICATE OF CORRECTION

PATENT NO. : 6,466,416 B1
DATED : October 15, 2002
INVENTOR(S) : Honjo et al.

It is certified that error appears in the above-identified patent and that said Letters Patent is hereby corrected as shown below:

<u>Column 14,</u>
Line 30, "TiN" should be -- TiW --.

Signed and Sealed this

Twenty-eighth Day of October, 2003

JAMES E. ROGAN
*Director of the United States Patent and Trademark Office*